Figure 1:
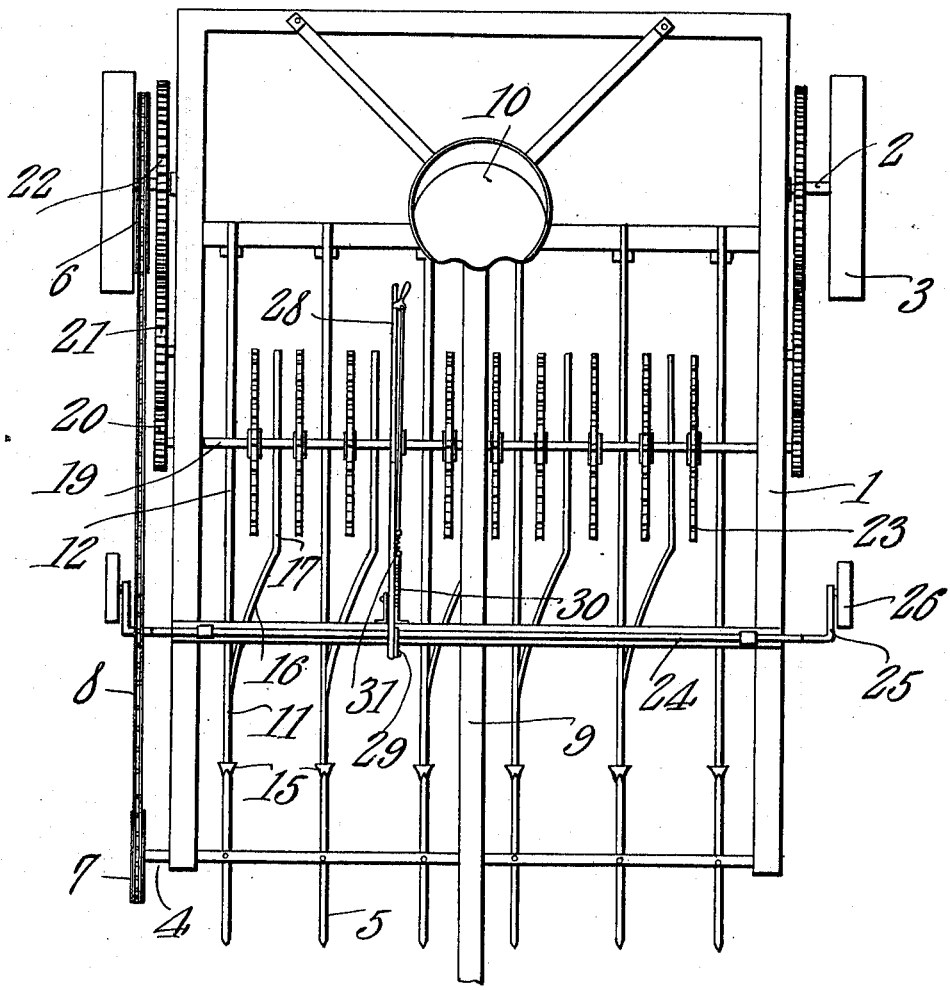

H. W. VAIL.
STALK SHREDDER.
APPLICATION FILED SEPT. 7, 1910.

993,001.

Patented May 23, 1911
2 SHEETS—SHEET 1.

Witnesses
E. J. Stewart
J. T. Lawson

Inventor
Henry W. Vail.
By C. A. Snow & Co.
Attorneys

H. W. VAIL.
STALK SHREDDER.
APPLICATION FILED SEPT. 7, 1910.
993,001.
Patented May 23, 1911.
2 SHEETS—SHEET 2.
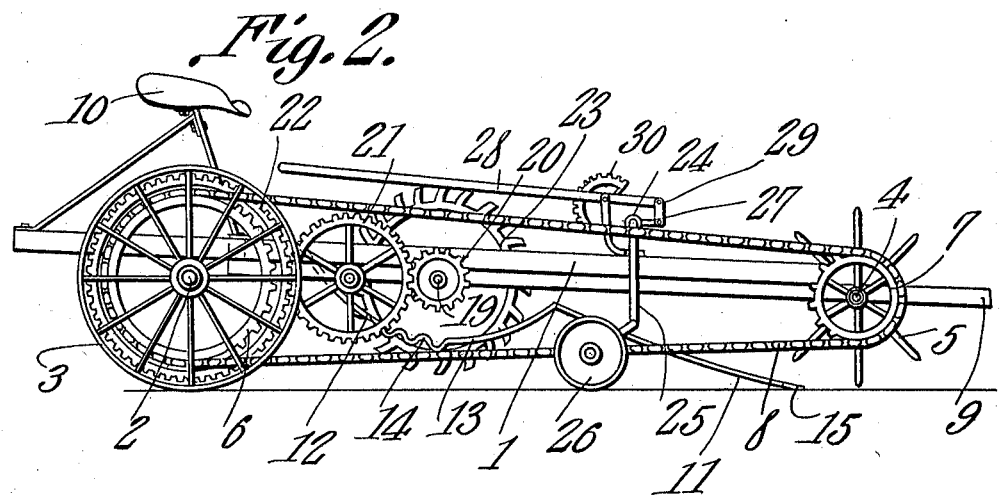
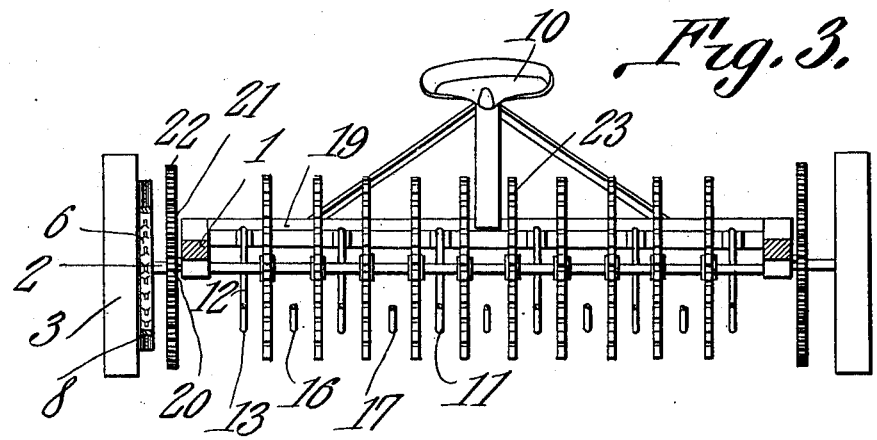
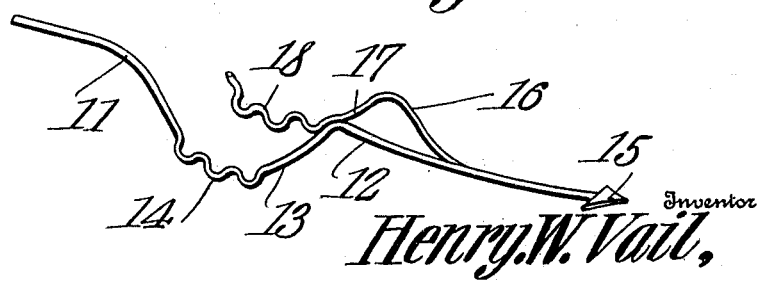
Henry W. Vail, Inventor
By C. A. Snow & Co., Attorneys
Witnesses

UNITED STATES PATENT OFFICE.

HENRY W. VAIL, OF MACOMB, ILLINOIS.

STALK-SHREDDER.

993,001.  Specification of Letters Patent.  Patented May 23, 1911.

Application filed September 7, 1910. Serial No. 580,829.

*To all whom it may concern:*

Be it known that I, HENRY W. VAIL, a citizen of the United States, residing at Macomb, in the county of McDonough and State of Illinois, have invented a new and useful Stalk-Shredder, of which the following is a specification.

This invention has relation to stalk shredders and it consists in the novel construction and arrangement of its parts hereinafter shown and described.

The object of the invention is to provide a simple and an effective machine especially adapted to operate upon corn stalks which may be upon the ground for the purpose of reducing them to shreds and leaving the shreds upon the surface of the ground to be turned under by subsequent plowing for the purpose of fertilizing the soil and rendering the soil in proper condition to receive a planting of oats or corn.

With the above object in view the machine consists of a wheel-mounted frame having a reel journaled thereon and operatively connected with one of the supporting wheels. A series of pikes or forks is also mounted upon the frame and is adapted to lift the stalks after they have been broken down by the said reel. The said pikes or forks are provided with concaved portions into which the stalks are finally passed and said concaved portions are provided with irregular or crinkled sections which are adapted to be engaged by the stalks and which serve as obstructions to prevent the stalks from passing through the concave until they have been thoroughly shredded. A series of saws is arranged to operate over the concaved portions of the said pikes or forks and said saws are provided with blades or teeth adapted to engage the stalks and reduce the same to shreds. The saws are operatively connected with the supporting wheels of the frame, as will be hereinafter explained.

In the accompanying drawings,—Figure 1 is a top plan of the machine. Fig. 2 is a side elevation of the same. Fig. 3 is a vertical transverse sectional view of the same. Fig. 4 is a perspective view of one of the pikes or forks detached.

The machine includes a frame 1 which is mounted at its rear portion upon an axle 2 to the ends of which are secured ground wheels 3. A shaft 4 is journaled for rotation at the forward portion of the frame 1 and is provided with a series of members 5 which collectively serve as a reel for forcing the stalks rearwardly. A sprocket wheel 6 is fixed to the axle 2 and a sprocket wheel 7 is fixed to the shaft 4. A sprocket chain 8 passes around the sprocket wheels 6 and 7 and is adapted to transmit rotary movement from the axle 2 to the shaft 4. A draft tongue 9 projects forwardly from the frame 1 and an operator's seat 10 is mounted upon the rear portion of the said frame.

The machine is provided with pikes or forks 11 which are of the usual configuration and as they are all of the same design the description of one will answer for all. Each pike or fork is formed from metallic rods and the side portion 12 of each pike or fork is secured at its rear end to a cross bar forming a part of the frame 1. At a point intermediate its ends the side rod 12 is concaved as at 13 and is provided with the irregularities or crinkles 14. The forward portion of the rod 12 is downwardly inclined and at its forward extremity is located a barb or spear head 15. The side rod 16 is attached to the side rod 12 at a point between the forward end of the concaved section 13 and the barb 15 and the said rod 16 is provided with a concaved section 17 having irregularities or crinkles 18. The rear end portion of the side rod 16 is unattached to any portion of the frame 1.

A shaft 19 is journaled for rotation upon the intermediate portion of the frame 1 and is provided at its ends with gear wheels 20. Gear wheels 21 are journaled for rotation upon the frame 1 and mesh with the gear wheel 20. Gear wheels 22 are fixed to the end portions of the axle 2 and mesh with the gear wheels 21. Thus means is provided for transmitting rotary movement from the axle 2 to the shaft 19 and by the triplicate train of gears it will be observed that the shaft 19 rotates in the same direction as that in which the axle 2 rotates. Saws 23 are mounted upon the shaft 19 and are located in planes between the adjacent pikes or forks 11 and between the side rods 12 and 16 of the respective pikes or forks.

A shaft 24 is journaled upon the forward portion of the frame 1 and is provided with depending crank end sections 25 to which are journaled wheels or rollers 26. A forwardly disposed arm 27 is fixed to the intermediate portion of the shaft 24 and a lever 28 is fulcrumed upon the frame 1. The working end of the lever 28 is operatively connected with the forward end of the arm 27 by means of a link 29. A gear segment 30 is also mounted upon the frame 1 and is adapted to be engaged by a spring actuated pawl 31 carried by the lever 28.

In operation as the machine is drawn over the surface of the ground the reel members 5 rotate as indicated and force the stalks rearwardly. When the stalks are engaged by the portions of the pikes or forks immediately behind the barbs 15 the said stalks are elevated along the side rod sections 12 and 16 until they enter the concaved portions 13 and 17. When the stalks enter the said portions they are engaged by the teeth of the saws 23 and are carried back until the stalks encounter the obstructions or crinkles 14 and 18 when those portions of the stalk which engage the said obstructions or crinkles are retarded while the teeth of the saws 23 in contact with the stalks at points between the said obstructions or crinkles tear and shred the stalks into fine bits which bits are left upon the surface of the ground and may be turned under at subsequent plowing.

When it is desired to turn the machine around or when the machine is being transported from place to place the lever 28 may be swung so that the shaft 24 is turned upon its axis whereby the crank ends 25 are turned and the wheels or rollers 26 are forced down in contact with the surface of the ground whereby the forward portion of the frame 1 is elevated and the barbed ends of the pikes or forks 11 and the peripheries of the members 5 are elevated above the surface of the ground to such an extent as to fail to operate upon the stalks or other standing vegetation.

Having described the invention what I claim as new and desire to secure by Letters Patent is:—

1. A stalk shredder comprising a wheel-mounted frame, means for forcing the stalks rearwardly located at the forward portion of the frame, stalk-elevating devices carried by the frame and having concaved portions provided with obstructive sections and shredding saws journaled for rotation above the frame and operating above the concaved portions of the stalk-elevating devices, and means operatively connecting the said saws with the supporting wheels of the frame.

2. A stalk shredder comprising a wheel-mounted frame, means located at the forward portion of the frame for forcing the stalks rearwardly, stalk-elevating devices attached to the frame and consisting of side rods spaced from each other at their rear portions and provided with concaved portions having obstructive sections and shredding saws journaled for rotation upon the frame above the concaved portions of the stalk-elevating devices, and means operatively connecting the said saws with the supporting wheels of the frame.

3. A stalk shredder comprising a wheel-mounted frame, means located at the forward portion of the frame for forcing the stalks rearwardly, stalk-elevating devices consisting of rod sections joined together at their forward portions and having concaved portions spaced from each other, said concaved portions being provided with obstructive sections, barbs located at the forward ends of said elevating devices, saws journaled for rotation upon the frame and arranged to operate over the concaved portions of the elevating devices, and means operatively connecting said saws with the supporting wheels of the frame.

4. A stalk shredder comprising a wheel-mounted frame, a reel journaled for rotation at the forward portion of the frame and adapted to force the stalks rearwardly, means operatively connecting said reel with the supporting wheels of the frame, stalk elevating devices mounted upon the frame and consisting of side rods joined together at their forward portions and having spaced concaved portions provided with stalk-obstructive sections, barbs located at the forward ends of said stalk elevating devices, shredding saws journaled for rotation upon the frame and arranged to operate over the concaved portions of said stalk elevating devices, and means operatively connecting said shredding saws with the supporting wheels of the frame.

In testimony that I claim the foregoing as my own, I have hereto affixed my signature in the presence of two witnesses.

HENRY W. VAIL.

Witnesses:
LYMAN B. VOSE,
T. Z. CREEL.

Copies of this patent may be obtained for five cents each, by addressing the "Commissioner of Patents, Washington, D. C."